United States Patent
Lund (10) Patent No.: US 7,966,422 B2
(45) Date of Patent: Jun. 21, 2011

(54) SYSTEM AND METHOD FOR COMMUNICATING BETWEEN SERVERS USING A MULTI-SERVER PLATFORM

(75) Inventor: Martin Lund, Menlo Park, CA (US)

(73) Assignee: Broadcom Corporation

( * ) Notice: Subject to any disclaimer, the term of this patent is extended or adjusted under 35 U.S.C. 154(b) by 1104 days.

(21) Appl. No.: 10/648,004

(22) Filed: Aug. 26, 2003

(65) Prior Publication Data

US 2004/0199568 A1 Oct. 7, 2004

Related U.S. Application Data (60) Provisional application No. 60/448,656, filed on Feb. 18, 2003, provisional application No. 60/456,831, filed on Mar. 21, 2003, provisional application No. 60/458,719, filed on Mar. 28, 2003, provisional application No. 60/463,014, filed on Apr. 15, 2003.

(51) Int. Cl.
  *G06F 15/16* (2006.01)
  *G06F 15/173* (2006.01)
(52) U.S. Cl. ........................................ 709/245; 709/238
(58) Field of Classification Search .................. 709/238, 709/245; 370/392, 389
  See application file for complete search history.

(56) References Cited

U.S. PATENT DOCUMENTS

| | | | |
|---|---|---|---|
| 5,920,566 A * | 7/1999 | Hendel et al. ................. | 370/401 |
| 6,208,647 B1 * | 3/2001 | Deng et al. .................... | 370/390 |
| 6,574,240 B1 * | 6/2003 | Tzeng ............................ | 370/469 |
| 6,904,482 B2 * | 6/2005 | Rietze et al. ................... | 710/107 |
| 7,079,537 B1 * | 7/2006 | Kanuri et al. ................. | 370/392 |
| 7,225,247 B2 * | 5/2007 | Kennedy et al. ............... | 709/223 |
| 7,236,490 B2 * | 6/2007 | Chang et al. .................. | 370/392 |
| 2002/0124114 A1 | 9/2002 | Bottom et al. | |
| 2002/0188718 A1 | 12/2002 | McGraw et al. | |
| 2003/0069975 A1 * | 4/2003 | Abjanic et al. ................. | 709/227 |
| 2003/0188222 A1 * | 10/2003 | Abbondanzio et al. ......... | 714/12 |

FOREIGN PATENT DOCUMENTS

EP  1 450 537  8/2004

\* cited by examiner

*Primary Examiner* — Joseph E Avellino
*Assistant Examiner* — Chirag Patel
(74) *Attorney, Agent, or Firm* — McAndrews, Held & Malloy, Ltd.

(57) ABSTRACT

Aspects of the invention may include receiving a packet from a first of a plurality of blade servers coupled via a common bus. An identifier associated with a second blade server may be determined based on at least a portion of the received packet and at least a portion of the received packet may be routed to at least the second blade server. At least a portion of the received packet may be transferred to at least the second blade server via the common bus. Routing of at least a portion of the received packet may be controlled by a switch blade which may also be coupled to the common bus. In order to route information in the server, an identifier of the first blade server, the second blade server and the switch blade may be determined. Exemplary identifiers may be a MAC address and/or an IP address.

30 Claims, 7 Drawing Sheets

SYSTEM AND METHOD FOR COMMUNICATING BETWEEN SERVERS USING A MULTI-SERVER PLATFORM

CROSS-REFERENCE TO RELATED APPLICATIONS/INCORPORATION BY REFERENCE

This application makes reference to, and/or claims priority to and/or claims benefit to:

U.S. Provisional Patent Application Ser. No. 60/448,656, entitled "A Method and System to Provide External Communication Using a Multi-Server Platform Having a Single Switch Backplane" and filed on Feb. 18, 2003;

U.S. Provisional Patent Application Ser. No. 60/456,831, entitled "Method and System to Provide Inter-Blade Server Communication Using a Single Switch Backplane" and filed on Mar. 21, 2003;

U.S. Provisional Patent Application Ser. No. 60/458,719, entitled "Method and System to Provide Inter-Chassis Blade Server Integration for Scalability" and filed on Mar. 28, 2003; and U.S. Provisional Patent Application Ser. No. 60/463,014, entitled "Method and System to Selectively Steer Data Traffic to Service Blades Using a Single Switch Backplane" and filed on Apr. 15, 2003.

The above stated applications are hereby incorporated herein by reference in their entirety.

FIELD OF THE INVENTION

Certain embodiments of the invention relate to communication among servers. More specifically, certain embodiments of the invention relate to a method and system for inter-blade server communication across a common backplane.

BACKGROUND OF THE INVENTION

A server may be a computer system in a network that may be accessed by one or more users and/or other computers. The server may provide, for example, access to information such as files, and to services such as communications, printing or other types of services that may be available through a network. In some cases, a special network operating system (OS) may run on a dedicated server, for example, in a large network. A personal computer (PC) operating system may run on a non-dedicated server having, for example, peer-to-peer networking software running thereon.

Generally, a server may have one or more advanced or more powerful central processing units (CPUs), a larger memory, a larger cache and more storage space than a typical single user workstation or personal computer. The server may include, for example, multiple processors which may be dedicated to a particular service or provide a particular function such as e-mail handling, printing or communications. The server may also include devices such as, large power supplies, backup power capabilities such as an uninterruptible power supply (UPS) and various fault tolerant or redundant features such as redundant array of independent disks (RAID) technologies.

A single server may exist in a standalone enclosure and may interface with a network via one or more network interfaces. Multiple standalone boxes may be situated in a central computing center with each standalone box coupled to a network via a respective cable. Each server may interface to the network separately at a particular data rate such as, for example, approximately 1 gigabits/second (Gb/s) for a Gigabit Ethernet or approximately 10 Gb/s for a 10 Gigabit Ethernet.

Thus, the single server in a standalone enclosure may inefficiently utilize large amounts of space and/or power. Furthermore, since each single server may be connected to the network directly via a respective cable, a room full of servers might be overflowing with cables possibly necessitating detailed cable maps which may be quite time-intensive and costly to produce. In addition, single servers in a standalone enclosure may not be easily replaced during failure, particularly when there may be multiple failures. Consequently, the conventional single server in a standalone box may ultimately suffer from a substantial total cost of ownership (TCO).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for communicating information in a multiserver platform. Aspects of the method for communicating information in a multiserver platform may include receiving at least one packet from a first blade server of a plurality of blade servers. At least a portion of the blade servers may be coupled to a common bus. One or more identifiers associated with a second blade server may be determined based on at least a portion of the received packet. At least a portion of the received packet may be routed to at least the second blade server and/or transferred to at least the second blade server via the common bus. Routing of at least a portion of the received packet may be controlled by a switch blade.

In order to route information in the server, an identifier of the first blade server, the second blade server and the switch blade may be determined. The identifiers of the first blade server, the second blade server and the switch blade may be, for example, a MAC address and/or an IP address. At least one identifier of the first blade server may be acquired and/or transferred to the switch blade and/or the other blade servers. At least a portion of the received packet may be transferred over the common bus to any of the blade servers and/or the switch blade. In another aspect of the invention, a broadcast containing one or more received packets may be received via the common bus. At least one packet may be received from the second blade server and at least a portion of that packet may be transferred to the first blade server and/or a third blade server.

Another embodiment of the invention may provide a machine-readable storage, having stored thereon, a computer program having at least one code section for communicating information in a server. The at least one code section may be executable by a machine, thereby causing the machine to perform the steps as described above for communicating information in a multiserver platform.

Aspects of the system for processing information in a multiserver platform may include a switch blade for receiving at least one packet from a first blade server of a plurality of blade servers. At least a portion of the blade servers and the switch blade may be coupled to a common bus. One or more identifiers associated with a second blade server may be determined by the switch blade based on at least a portion of the received packet. At least a portion of the received packet may be routed by the switch blade to at least the second blade server. The switch blade may control transfer of at least a portion of the received packet to at least the second blade server via the common bus.

In order to route information in the server, an identifier of the first blade server, the second blade server and any of the other blade servers may be determined by the switch blade. The identifiers of the first blade server, the second blade server and the switch blade may be, for example, a MAC address and/or an IP address. At least one identifier of the first blade server may be acquired and/or transferred to the switch blade and/or the other blade servers by the switch blade. The switch blade may also be adapted to transfer at least a portion of any received packet over the common bus. In another aspect of the invention, a broadcast containing one or more received packets may be received by the switch blade via the common bus. The switch blade may also receive at least one packet from the second blade server and transfer at least a portion of that received packet to the first blade server and/or a third blade server.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for communicating information in a multiserver platform. Aspects of the method may include receiving a packet from a first blade server of a plurality of blade servers, which may be coupled via a common bus. An identifier associated with a second blade server may be determined based on at least a portion of the received packet, and at least a portion of the received packet may be routed to at least the second blade server. In another aspect of the invention, at least a portion of the received packet may be transferred to another blade server such as the second blade server via the common bus. Additionally, routing of at least a portion of the received packet may be controlled by a switch blade which may also be coupled to the common bus.

In order to route information in the server, an identifier of the first blade server, the second blade server and the switch blade may be determined. Exemplary identifiers may include a MAC address and/or an IP address. An identifier of the first blade server may be acquired and/or transferred to the switch blade and/or the other blade servers. At least a portion of any received packet may be transferred over the common bus to any of the blade servers including the switch blade. In another aspect of the invention, a broadcast containing one or more received packets may also be received via the common bus. Additionally, at least one packet may be received from the second blade server and at least a portion of that packet may be transferred to the first blade server and/or a third blade server.

Figure 1:
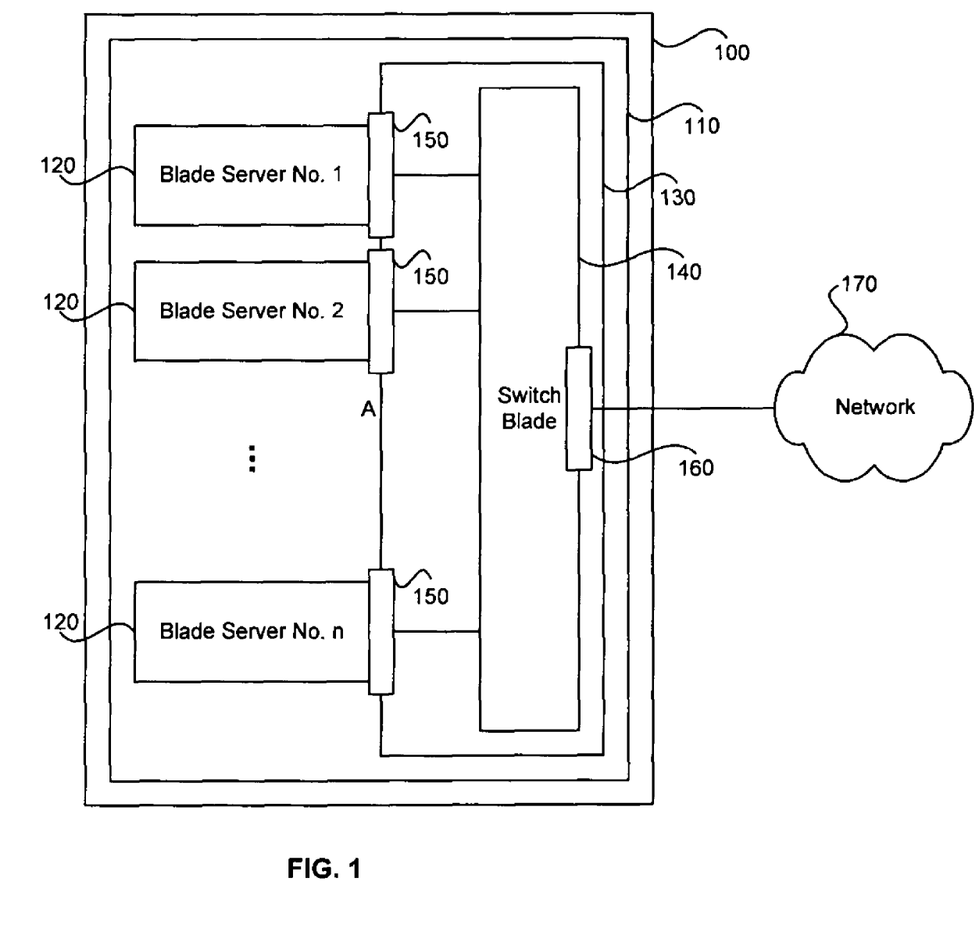
FIG. 1 is a block diagram of an embodiment of a multi-server platform in accordance with an embodiment of the present invention.

FIG. 1 is a block diagram of an embodiment of a multi-server platform 100 in accordance with an embodiment of the present invention. The multi-server platform 100 may include a chassis 110, a backplane 130, a switch blade 140, blade server interfaces 150, and a plurality of blade servers No. 1, No. 2, ..., No. n, collectively referenced as 120.

The chassis 110 may include the backplane 130. However, although only one backplane 130 is shown, the invention is not so limited and a plurality of backplanes may be provided within the chassis 110. In this regard, one or more backplanes may be coupled together. In a case where the chassis 110 may include a single backplane, the backplane may be regarded as a common backplane, which may provide connectivity for the blade servers 120. The chassis 110 may be part of a single installation enclosure that includes a plurality of blade server slots which may be adapted for receiving one or more of the blade servers 120.

The backplane 130 may include, for example, one or more blade server interfaces collectively referenced as 150, which may be referred to as blade server interconnects. In this regard, the chassis 110 may include a plurality of blade server slots that may be adapted to facilitate connection between the blade servers and the blade server interfaces 150. In other words, the blade server slots may provide a conduit for coupling the blade servers 120 to the blade server interfaces 150. The backplane 130 may also include one or more interfaces such as a network interface 160. The network interface 160 may be referred to as network interconnect.

The switch blade 140 may be part of the backplane 130. In this regard, the switch blade 140 may be integrated within the backplane 130 or it may be a plug-in card that may be plugged into the backplane 130.

The blade servers 120 may be coupled to the backplane 130 via the blade server interfaces 150. Each of the blade servers 120 may therefore be coupled to a corresponding one of the server interfaces 150. For example, each of the blade servers 120 may be plugged into or removably mounted in a corresponding blade server slot in the chassis 110 so that it interfaces with a corresponding one of the server interfaces. In this regard, the blade servers 120 may be coupled to the backplane 130.

Once the blade servers 120 are mounted or plugged into the chassis 110, the blade servers 120 may be coupled to the switch blade 140 of the backplane 130 via the blade server interfaces 150. The backplane 130 may be adapted to provide connectivity, for example, between two or more of the blade servers 120. Furthermore, the backplane 130 and/or the switch blades 140 may provide connectivity between the one or more of the blade servers 120 and the network 170.

The network interface 160 facilitates connectivity between the backplane 130 and the network 170. In this regard, the network interface 160 may couple backplane 130 and/or one or more of the plurality of switch blades 140 to the network 170.

Figure 2:
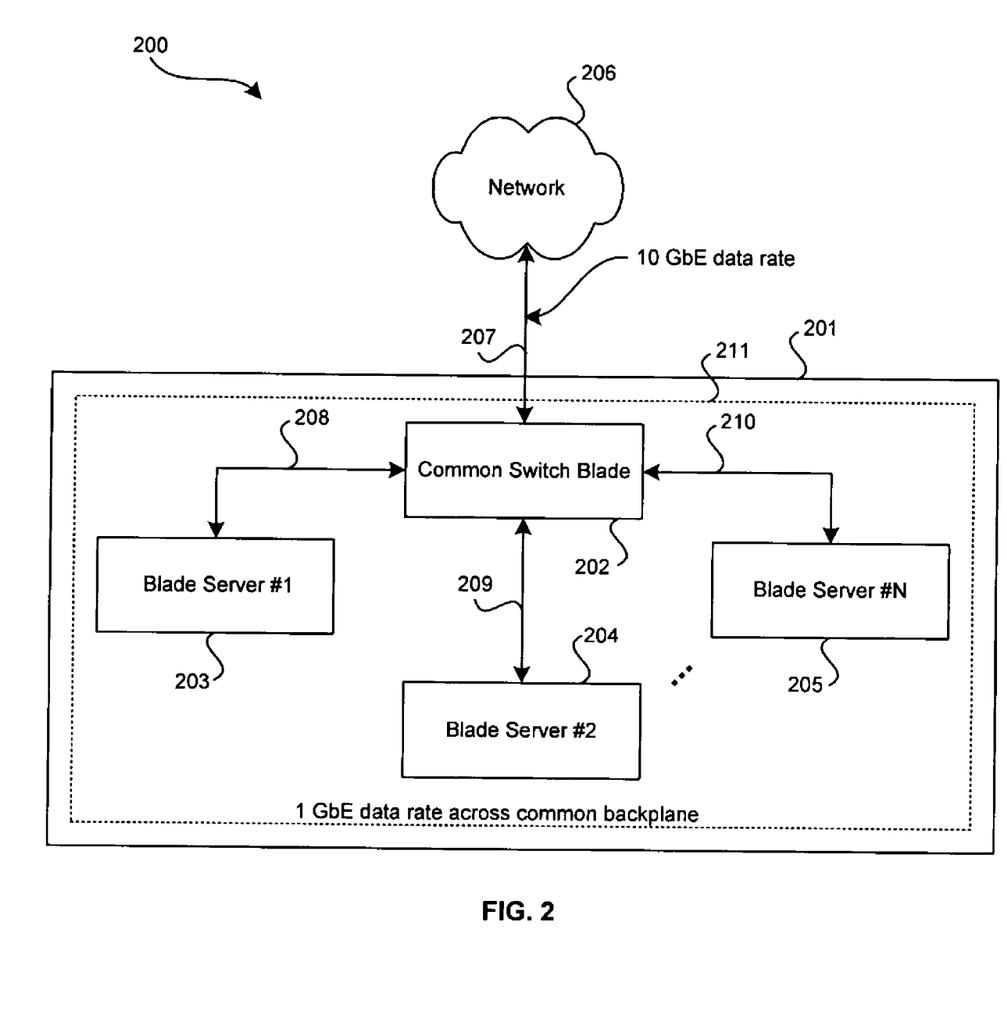
FIG. 2 is a block diagram illustrating an embodiment of a communication system including a multi-server platform and an external network, in accordance with various aspects of the invention.

FIG. 2 is a block diagram illustrating an embodiment of a communication system 200 including a multi-server platform 201 and an external network 206, in accordance with various aspects of the invention. The multi-server platform 201 may include a chassis having a common backplane 211, a common switch-blade 202 and a plurality of blade servers including, a blade server #1 203, a blade server #2 204, . . . , blade server #N 205, where N may be any integer number.

Each of the blade servers #1, #2, . . . , #N may be a server that has been integrated on a single plug-in card or blade that may be plugged into a blade server slot of the chassis with the common backplane 211. The chassis with a common backplane 211 may provide a single installation enclosure for the multiple blade servers #1, #2, . . . , #N.

The chassis with the common backplane 211 may also serve a common interface between each blade server 203, 204, 205 and the common switch blade 202. For example, common backplane 211 may provide a common backplane interface 208 between blade server #1 203 and the common switch blade 202. Common backplane 211 may also provide a common backplane interface 209 between blade server #2 204 and the common switch blade 202. Finally, common backplane 211 may provide a common backplane interface 210 between blade server #N 205 and the common switch blade 202. In this regard, the common backplane interfaces 208, 209, 210 are part of the common backplane 211.

The common switch blade 202 may include N+1 interfaces and at least a portion of these interfaces may be adapted to perform packet switching of data frames between the N blade servers and the external network 206, in accordance with an embodiment of the invention. The common switch-blade may include intelligence that may manage and distribute data traffic to the relevant blade servers including blade server #1, #2, . . . , #N. The common switch-blade 202 may interface with each of the N blade servers via the common backplane 211. The common switch-blade 202 may also interface with the external network 206, thereby resulting in N+1 interfaces.

In accordance with an embodiment of the invention, the external network 206 may include a 10 Gigabit Ethernet network connection and interface. The external interface 207 between the common switch blade 202 and the external network 206 may include a 10 Gigabit Ethernet (GbE) interface, operating at a data rate of 10 Gb/s. In this regard bi-directional network communication capability may be provided between the external network 206 and the common switch blade 202. In order to facilitate Gigabit Ethernet communication, the common backplane 211 may include a plurality of Gigabit Ethernet (GbE) interfaces. The switch blade 202 may communicate with each of the N blade servers independently over the common backplane 211 at a data rate of 1 Gb/s. For example, the blade server #1 203 may communicate in a bi-directional manner with the common switch-blade 202 via the common backplane interface 208. The blade server #2 204 may also communicate in a bi-directional manner with the common switch blade 202 via the common backplane interface 209. Finally, the blade server #N 105 may communicate in a bi-directional manner with the common switch blade 202 via the common backplane interface 210.

In accordance with an embodiment of the present invention, the common switch blade 202 may have the capability to handle communication with the multiple blade servers 203, 204, 205 at the same time. In this regard, the common blade server 202 may facilitate the simultaneous transfer of information between any of the blade servers 203, 204, 205.

Figure 3:
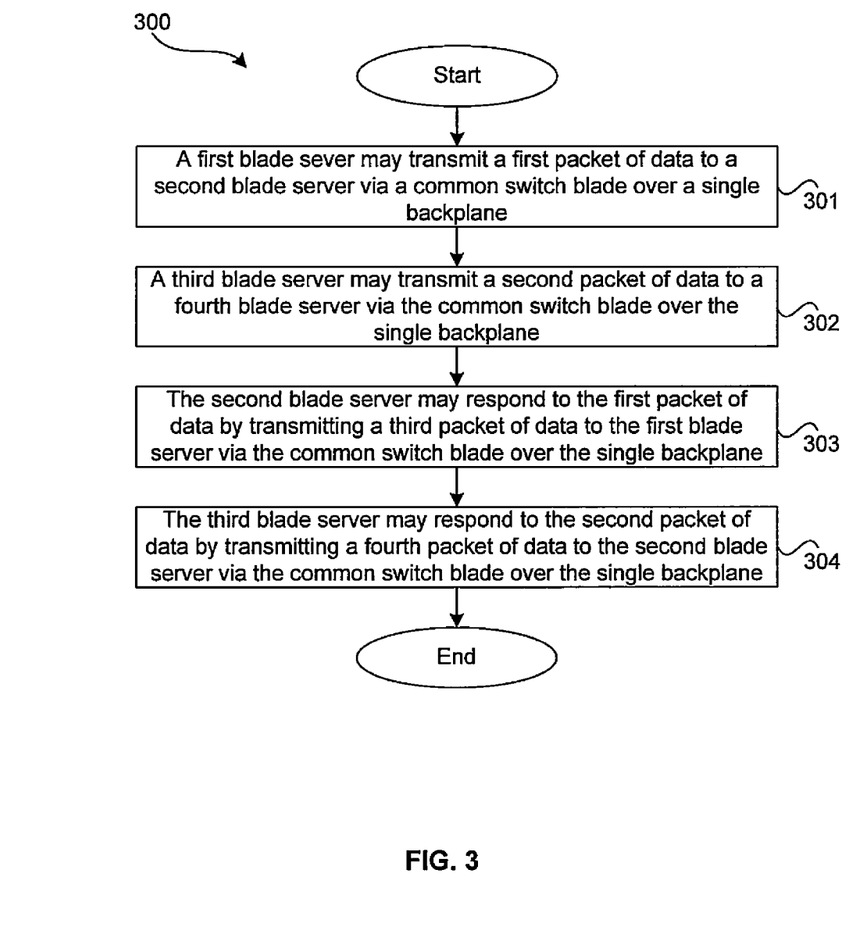
FIG. 3 is a flowchart illustrating exemplary steps for providing inter-blade server communication using the multi-server platform of FIG. 2, in accordance with an embodiment of the invention.

FIG. 3 is a flowchart 300 illustrating exemplary steps for providing inter-blade server communication using the multi-server platform 200 of FIG. 2, in accordance with an embodiment of the invention. Referring to FIG. 3, in step 301, a first blade server may transmit a first packet of data to a second blade server via a common switch blade over a single backplane. In step 302, a third blade server may transmit a second packet of data to a fourth blade server via the common switch blade over the single backplane. In step 303, the second blade server may respond to the first packet of data by transmitting a third packet of data to the first blade server via the common switch blade over the single backplane. In step 304, the third blade server may respond to the second packet of data and transmit a fourth packet of data to the second blade server via the common switch blade over the single backplane.

In an aspect of the invention, at least one of the server blades may be configured to provide a switching function. Accordingly, the server blade that is configured to provide the switching function may be referred to as a switch blade. The common switch blade, which may also be referred to as switch blade, may include suitable hardware and/or software that may be utilized to switch packets and/or connections between two or more blade servers wishing to communicate. The blade server may therefore have the capability to function as a softswitch and/or a hardware switch. In any case, the switch blade and the other server blades may be coupled to at least one backplane so that signals associated with each of the blade servers may be accessible by the switch blade, the latter of which is also coupled to the backplane. The backplane may therefore be referred to as a common backplane.

Figure 4:
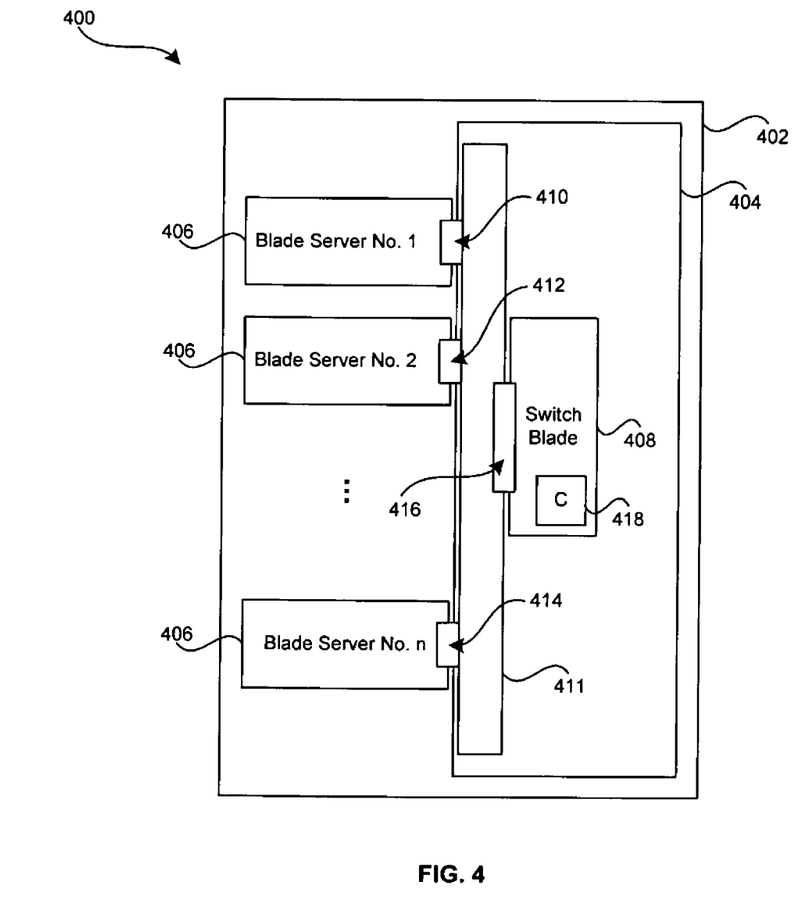
FIG. 4 is a block diagram illustrating a common backplane for interconnecting a plurality of blade servers in accordance with an embodiment of the invention.

FIG. 4 is a block diagram illustrating a common backplane for interconnecting a plurality of blade servers in accordance with an embodiment of the invention. Referring to FIG. 4, there is shown an enclosure or chassis 402, a backplane 404, a plurality of n blade servers collectively referred to as 406, a switch blade 408 and a bus 411. Also shown are bus transceivers 410, 412, 414, 416 and a controller 418. Each of the bus transceivers 410, 412, 414, 416 may include at least one transmitter that may transmit electrical signals onto the bus 411 within the backplane 404. Each of the bus transceivers 410, 412, 414, 416 may also include at least one receiver that may receive electrical signals onto the bus 411 within the backplane 404. The bus 411 may be a time division multiplexed (TDM) bus, a frequency division multiplexed (FDM) bus, or any other suitable type of bus. Accordingly, the bus transceivers 410, 412, 414, 416 may be suitable time division multiplexed bus transceivers and/or frequency division multiplexed bus transceivers, for example.

Each of the blade servers 406 and the switch blade 408 may include a bus transceiver that may be coupled to the bus 411. In this regard, blade server No. 1 includes a bus transceiver 410, server blade No. 2 includes a bus transceiver 412, and server blade No. n includes a bus transceiver 414. The switch blade 408 may also include a bus transceiver 416 and a bus controller 418. Although the bus controller 418 is illustrated as a separate entity within the switch blade 408, the invention is not so limited. Accordingly, one or more functions provided by the bus controller 418 may provided by the switch blade 408. In a case where all of the functions offered by the bus controller may be provided by the switch blade, this may eliminate a need for an additional bus processing entity such as the bus controller 418.

Notwithstanding, the bus controller 418 and/or the switch blade 408 may be adapted to control the transfer of messages between the blade servers 406 and the switch blade 408. In this regard, the bus controller 418 may handle functions such as bus access and bus arbitration. The bus controller 418 and/or the switch blade 408 may also provide a switching function that may permit messages to be transferred among the blade servers 406 via the switch blade and from an external source such as the network 170 (FIG. 1) to any one or more of the blade servers 406. For example, one or more messages received from the network 170 may be steered by the switch blade 408 to one or more of the blade servers 406 based on a message type and a function provided by one or more of the blade servers 406. U.S. patent application Ser. No. 10/648,573, filed Aug. 26, 2003, discloses a method and system for selective steering of data traffic of various data types to functionally dedicated blade servers which application is incorporated herein by reference in its entirety.

The bus controller 418 and/or the switch blade 408 may include suitable hardware and/or software that may be adapted to control, for example, bus access, bus arbitration and/or switching among the blade servers 406 and the switch blade 408. The hardware and/or software may therefore control the manner in which messages may be received from a first blade server and transferred, routed or switched to a second blade server via the switch blade 408.

Figure 5:
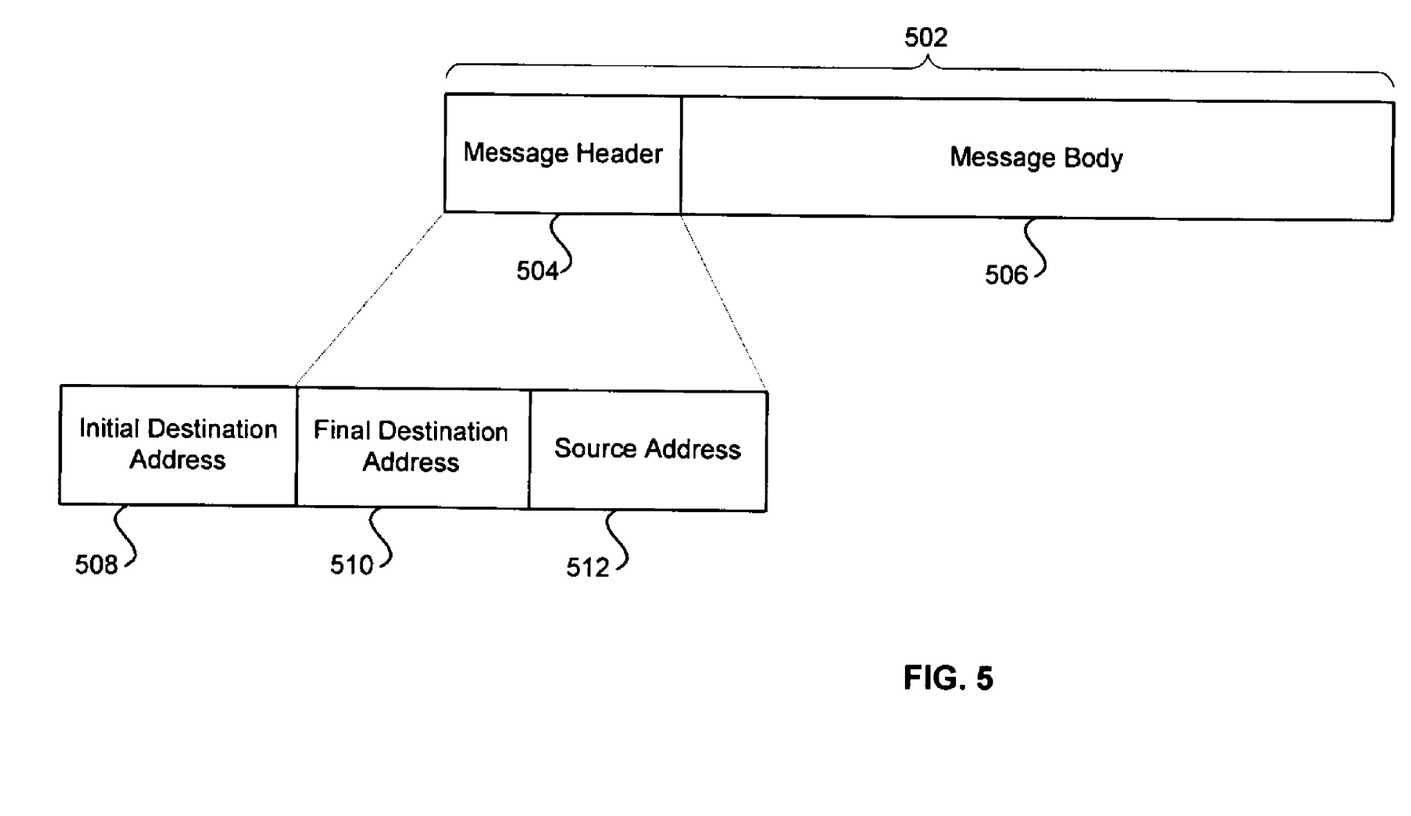
FIG. 5 illustrates an exemplary message format that may be utilized by a switch blade to transfer information in accordance with an embodiment of the invention.

FIG. 5 illustrates an exemplary message format that may be utilized by a switch blade to transfer information in accordance with an embodiment of the invention. Referring to FIG. 5, there is shown a message 502 having at least a message header 504 portion and a message body 506 portion. The message header portion 502 may be further sub-divided into at least an initial destination address 508 portion, a final destination address 510 portion and a source address 510 portion. The initial destination address 508 portion may contain an address of the blade that handles switching for the blade servers 406 (FIG. 4). The final destination address 510 portion may contain an address of a device or server blade to which the message 502 is being sent. The source address 512 portion may contain an address of a device or server blade that is sending the message 502. In one aspect of the invention, the source address, the initial destination address and the final destination address may be a medium access control (MAC) address and/or an Internet protocol (IP) address, for example. The message body 506 may contain actual data that may be utilized to transfer information among the blade servers 406 (FIG. 4).

Figure 6A:
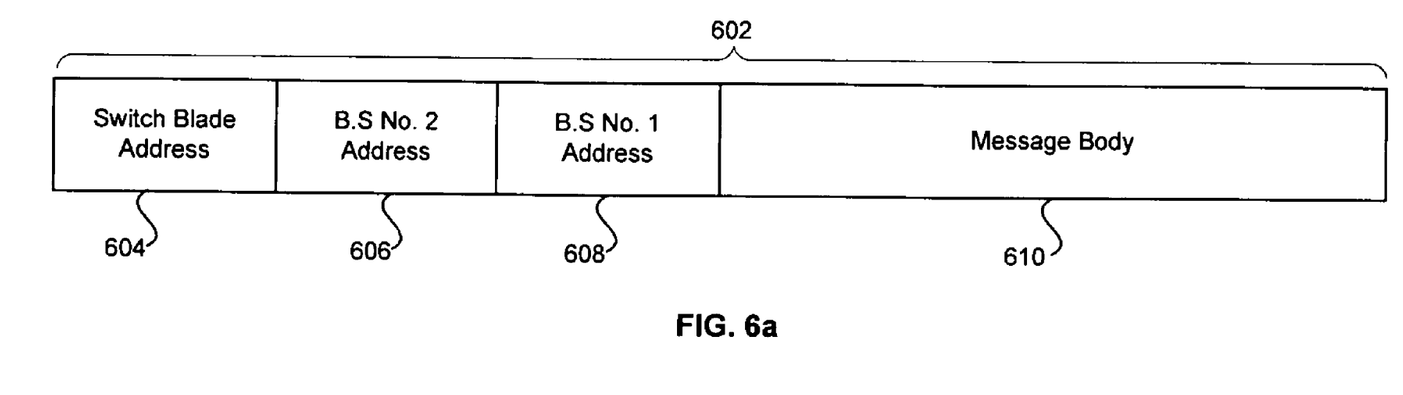
FIG. 6a is an exemplary message that may be utilized to transfer information from a first blade server to a second blade server in accordance with an embodiment of the invention.

In operation, it may be desirable to transfer a message from blade server No. 1 to blade server No. 2. Accordingly, blade server No. 1 may generate an appropriate message for the transfer. FIG. 6a is an exemplary message 602 that may be utilized to transfer information from a first blade server to a second blade server in accordance with an embodiment of the invention. Referring to FIG. 6a, the message 602 that may be generated by blade server No. 1 may include an initial destination address 604, final destination address 606, a source address 608 and a message body 610. The initial destination address 604 may include the address of the switch blade. The final destination address 606 may include the address of the second blade server (B.S No. 2) and the source address 608 may include the address of the first blade server (B.S No. 1). Once the message 602 has been generated by blade server No. 1, the transceiver 410 may transmit the message 602 over the bus 411, from which it may be received by the switch blade 408.

In one aspect of the invention, the message 602 may be placed in, for example, a particular time slot on the bus 411 that may be reserved for blade server No. 1. The switch blade 408 may listen to at least a portion of the times on the bus 411. In this regard, the switch blade 408 may listen to all the timeslots on the bus 411. In another aspect of the invention, the message 602 may be broadcasted on the bus 411 and may be received by the switch blade 408. In this regard, the transceiver 416 of the switch blade 408 may be configured by the switch blade controller 418 to listen on the bus for messages that may be placed on the bus 411 containing its address in the initial destination address portion 604 of the message 602.

Once the switch blade 408 determines that its own address is located in the initial destination address portion 604, its transceiver 416 may acquire the message 602 from the bus 411 (FIG. 4). Upon receiving the message 602, the switch blade 408 may determine the final destination address based on the final destination address field 606. The switch blade 408 may then route or switch the message 602 to blade server No. 2, which is specified in the final destination address portion 606 of the message 602. Prior to placing the message 602 on the bus to 410, the controller 418 may overwrite the initial destination address 604 with final destination address, which in this case, is the address of blade server No. 2. In this regard, the initial and final destination fields 604, 606 of the modified message 602 may have the same address. The transceiver 416 of the switch blade 408 may transmit the modified message 602 on the bus 411.

Figure 6B:
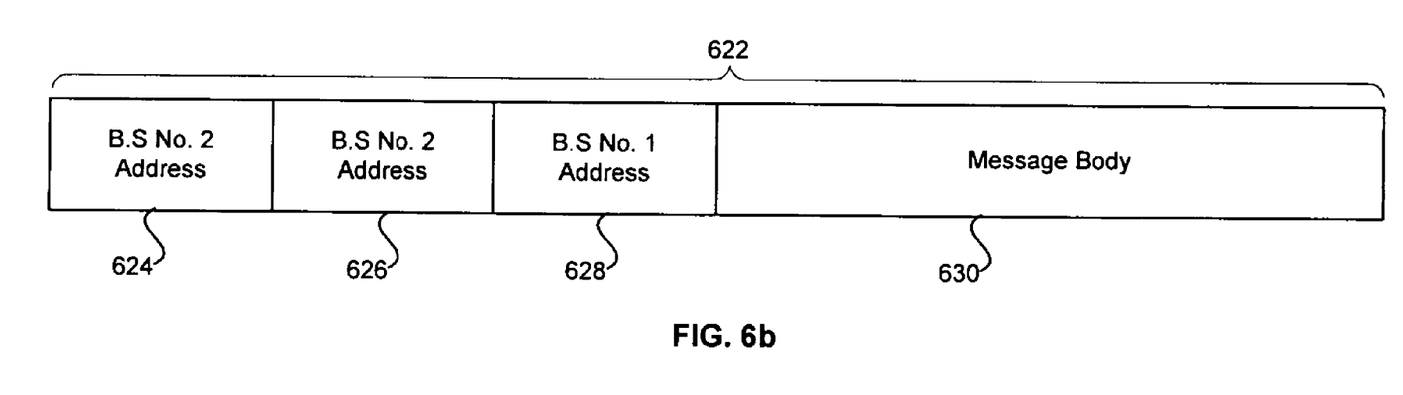
FIG. 6b is an exemplary message, which is a modified version of the message of FIG. 6a, that may be utilized to transfer information from a first blade server to a second blade server in accordance with an embodiment of the invention.

FIG. 6b is an exemplary message 622, which is a modified version of the message 620 of FIG. 6a, that may be utilized to transfer information from a first blade server to a second blade server in accordance with an embodiment of the invention. Referring to FIG. 6b, the initial destination address and the final destination address 624, 626 are the same and contain the address of blade server No. 2.

Blade server No. 2 may be configured to listen in on the bus 411 for messages containing its address in the initial destination address 624 portion of the message 622 of FIG. 6b or the initial and final destination addresses 624, 626 of the message 622 of FIG. 6b. Upon determining that its address is located within the initial and final destination addresses 624, 626 or within the initial destination address 624 portion of the message 622, the transceiver 412 (FIG. 4) of blade server No. 2 may receive the message 622 from the bus 411. Accordingly, blade server No. 2 may process the information contained in the message body 630 portion of the message 622.

Figure 7A:
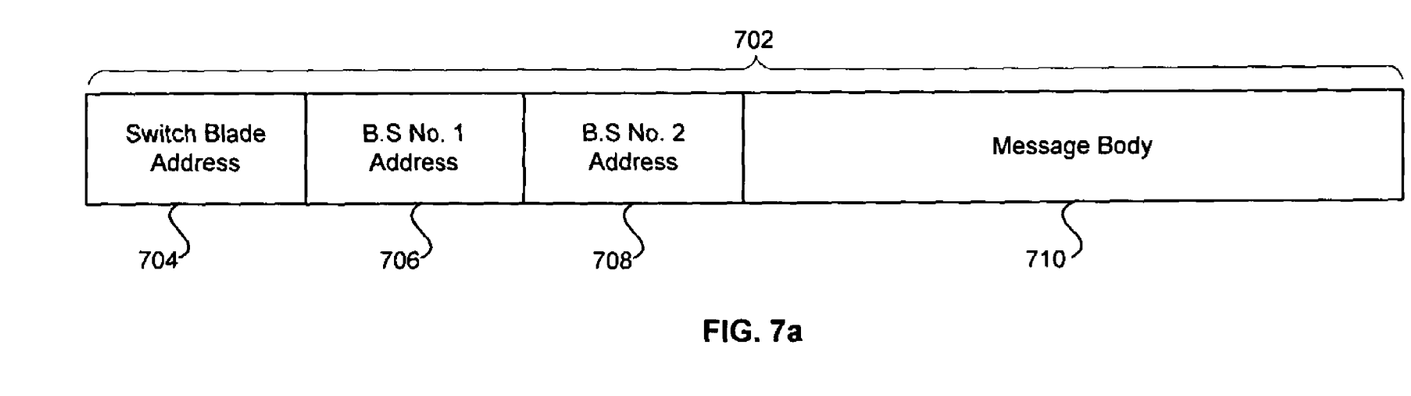
FIG. 7a, is an exemplary response message that may be utilized to transfer information from a first blade server to a second blade server in accordance with an embodiment of the invention.

In instances where it may be necessary for blade server No. 2 to send a response to blade server No. 1, then the blade server may prepare a response message. In this regard, the source of the received message may be determined from the source address 628 portion, which in this case, is blade server No. 1. FIG. 7a, is an exemplary response message 702 that may be utilized to transfer information from a first blade server to a second blade server in accordance with an embodiment of the invention. Referring to FIG. 7a, the message 702 that may be generated by blade server No. 2 may include an initial destination address 704, final destination address 706, a source address 708 and a message body 710. The initial destination address 704 may include the address of the switch blade 408. The final destination address 706 may include the address of the first blade server (B.S No. 1) and the source address 708 may include the address of the second blade server (B.S No. 2). Once the response message 702 has been generated by blade server No. 2, the transceiver 412 may transmit the message 702 over the bus 411, from which it may be received by the switch blade 408.

The transceiver 416 of the switch blade 408 may be configured by the switch blade controller 418 to listen on the bus for messages that may be placed on the bus 411 containing its address in the initial destination address portion 704 of the message 702. Once the switch blade 408 determines that its own address is located in the initial destination address portion 704, its transceiver 416 may acquire the message 702 from the bus 411. Upon receiving the message 702, the switch blade 408 may determine the final destination address based on the final destination address field 706. The switch blade may then route or switch the message 702 to blade server No. 1, which is specified in the final destination address portion 706 of the message 702. Prior to placing the message 702 on the bus to 410, the controller 418 may overwrite the initial destination address 704 with final destination address, which in this case, is the address of the blade server No. 1. In this regard, the initial and final destination fields 704, 706 of modified message 702 will have the same address. The transceiver 416 of the switch blade 408 may transmit the modified message 702 on the bus 411.

Figure 7B:
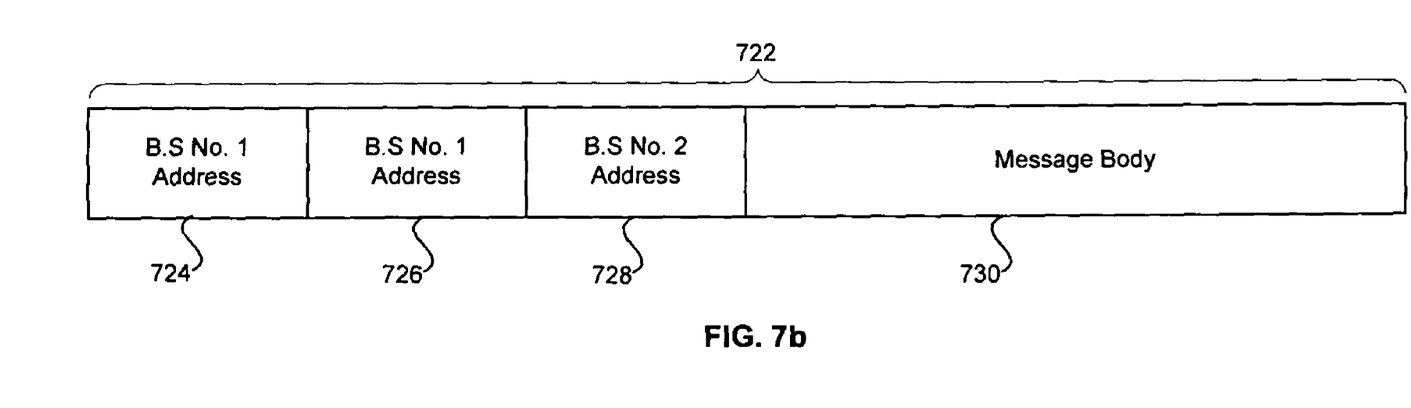
FIG. 7b is an exemplary message that is a modified version of the message of FIG. 7a that may be utilized to transfer information from a first blade server to a second blade server in accordance with an embodiment of the invention.

FIG. 7b is an exemplary message 722 that is a modified version of the message 720 of FIG. 7a that may be utilized to transfer information from a first blade server to a second blade server in accordance with an embodiment of the invention. Referring to FIG. 7b, the initial destination address and the final destination address 724, 726 are the same and contain the address of blade server No. 2. The source address 728 may be the same as the source address 708. The message body 730 may be similar to the message body 710.

Blade server No. 1 may be configured to listen in the bus 411 for messages containing its address in the initial destination address 724 portion of the message 722 of FIG. 7b or the initial and final destination addresses 724, 726 of the message 722 of FIG. 7b. Upon determining that its address is located within the initial and final destination addresses 724, 726 or within the initial destination address portion 724 of the message 722, the transceiver 412 of blade server No. 2 may receive the message 722 from the bus 411. Accordingly, blade server No. 2 may process the information contained in the message body 730 portion of the message 702.

The exemplary messages of FIG. 6a, FIG. 6b, FIG. 7a and FIG. 7b are utilized for illustrative purposes and the invention is not so limited. In this regard, other communication schemes may be utilized without departing from the various aspects for communicating between servers in a multiserver platform in accordance with the invention. For example, various time slot management schemes and/or packetization schemes may be utilized for communicating between servers in a multiserver platform in accordance with various aspects of the invention. In another aspect of the invention, messages may be broadcasted from at least one of the blade servers 406 (FIG. 4) over the common bus 411. In this regard, a broadcast address, for example, may be placed in at least the initial destination address 508 portion or the final address 510 portion of the message 510. For example, one or more messages may be broadcasted by the switch blade 408 over the common bus 411. A broadcast message may be utilized to instruct any of the blade servers 406 or the switch blade 408 to enter a particular operation mode or to execute a particular function. In another aspect of the invention, a message may be broadcasted over the common bus 411 that may instruct at least a portion of the blade servers 406 coupled to the common bus 411 to listen to a particular timeslot, for example, to acquire maintenance and/or provisioning instructions and/or operational parameters.

In another aspect of the invention, the rate of data communication between any of the blade servers 203, 204, . . . , 205 and the common switch blade 202 may be any standard or non-standard data rate, in accordance with various embodiments of the present invention. The rate of data communication between the common switch blade 102 and any of the blade servers 203, 204, . . . , 205 (FIG. 1) may be any standard or non-standard data rate, in accordance with various embodiments of the invention. In accordance with an embodiment of the invention, the multiple blade servers 203, 204, . . . 205 may each provide a plurality of functions. Alternatively, one or more of the blade servers 203, 204, . . . , 205 may be dedicated to providing a different, specific function.

The integration of multiple blade servers into a multi-server platform 100 may provide an increased server density and a easier management of the multiple servers since all the servers are situated in a single installation enclosure. Additionally, the integration of multiple blade servers may provide a more scalable system with greater reliability. With regard to scalability, more servers may be readily added, provisioned or commissioned to facilitate increased traffic and more servers may be readily removed to facilitate decreased traffic. The integration of multiple blade servers within a single enclosure may more readily facilitate the implantation of fault tolerance and redundancy. Accordingly, the redundancy may ultimately result in substantial reliability and significantly reduced downtime.

In accordance with another aspect of the invention, at least a portion of the blade servers 120 may include one or more of the characteristics as set forth below. The blade server 120 may be modular and self-contained, and may include, for example, a server on a card or a single-board computer (SBC). The blade server 120 may include for example, a computer disposed in an ultra-dense card or board. The ultra-dense card may include, but is not limited to, a central processing unit (CPU), a memory, a hard disk and networking components. The blade server 120 may be hot swappable, hot pluggable and/or adapted for plug-and-play capability. The chassis 110 may provide sharing among the blade servers 120 for one or more of the following: power supplies, cooling fans and access to the network 170 or storage.

In summary, aspects of the invention provide a method and system for inter-blade server communication across at least one backplane using a common switch-blade within a multi-server platform. The common switch-blade may have the capability to handle simultaneous communication of multiple blade servers within the multi-server platform. In particular, aspects of the system for processing information in a multi-server platform may include a switch blade that may receive at least one packet from a first of a plurality of blade servers. At least a portion of the blade servers and the switch blade may be coupled to a common bus. Notwithstanding, one or more identifiers associated with a second blade server may be determined by the switch blade based on at least a portion of the received packet. At least a portion of the received packet may be routed by the switch blade to at least the second blade server. The switch blade may control transfer of at least a portion of the received packet to at least the second blade server via the common bus.

In order to route information in the server, an identifier of the first blade server, the second blade server and any of the other blade servers may be determined by the switch blade. The identifiers of the first blade server, the second blade server and the switch blade may be, for example, a MAC address and/or an IP address. At least one identifier of the first blade server may be acquired and/or transferred to the switch blade and/or the other blade servers by the switch blade. The switch blade may also be adapted to transfer at least a portion of any received packet over the common bus. In another aspect of the invention, a broadcast containing one or more received packets may be received by the switch blade via the common bus. The switch blade may also receive at least one packet from the second blade server and transfer at least a portion of that received packet to the first blade server and/or a further blade server.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information, the method comprising:
   in a server comprising a common switch and a plurality of blade servers, said server performing functions comprising:
   receiving at said common switch, at least one packet from a first blade server of said plurality of blade servers, wherein said at least one packet is designated for at least a second blade server of said plurality of blade servers, and wherein said first blade server and said at least a second blade server are coupled to said common switch via a common bus;
   determining by said common switch, at least a first identifier identifying said common switch, a second identifier identifying said first blade server, and at least a third identifier identifying said second blade server, wherein said first, second and third identifiers are located within a header portion of said received at least one packet;
   modifying by said common switch, said at least one packet from said first blade server by changing said first identifier within said header portion; and
   routing via said common switch, at least a portion of said modified at least one received packet from said first blade server to at least said second blade server, based on said header portion of said modified at least one received packet,
   wherein said changing of said first identifier within said header portion comprises overwriting within said header portion of said modified at least one packet, said first identifier with said third identifier located within said modified at least one packet, by using said common switch.

2. The method according to claim 1, comprising transferring said header portion of said modified at least one received packet to said at least said second blade server via said common switch.

3. The method according to claim 1, wherein said common switch comprises a switch blade coupled to said common bus, and wherein said switch blade controls said routing of said header portion of said modified at least one received packet.

4. The method according to claim 1, wherein said common bus comprises a common backplane.

5. The method according to claim 1, wherein said common switch comprises a bus transceiver and a bus controller.

6. The method according to claim 1, wherein each of said first, second, and third identifiers comprises one or both of a MAC address and/or an IP address.

7. The method according to claim 1, comprising:
   acquiring said second identifier of said first blade server; and
   transferring via said common switch, said acquired second identifier of said first blade server to at least said second blade server.

8. The method according to claim 1, comprising broadcasting said header portion of said modified at least one received packet via said common switch.

9. The method according to claim 1, comprising receiving a broadcast containing said modified at least one received packet.

10. The method according to claim 1, comprising receiving at least one packet from said second blade server and transferring via said common switch, said header portion of said modified at least one packet received from said second blade server to at least one of said first blade server and a third blade server.

11. A non-transitory machine-readable storage having stored thereon, a computer program having at least one code section for communicating information, the at least one code section being executable by a machine for causing the machine to perform steps comprising:
   in a server comprising a common switch and a plurality of blade servers, said server performing functions comprising:
   receiving at said common switch, at least one packet from a first blade server of said plurality of blade servers, wherein said at least one packet is designated for at least a second blade server of said plurality of blade servers, and wherein said first blade server and said at least a second blade server are coupled to said common switch via a common bus;
   determining by said common switch, at least a first identifier identifying said common switch, a second identifier identifying said first blade server, and at least a third identifier identifying said second blade server, wherein said first, second and third identifiers are located within a header portion of said received at least one packet;
   modifying by said common switch, said at least one packet from said first blade server by changing said first identifier within said header portion; and routing via said common switch, at least a portion of said modified at least one received packet from said first blade server to at least said second blade server, based on said header portion of said modified at least one received packet, wherein said changing of said first identifier within said header portion comprises overwriting within said header portion of said modified at least one packet, said first identifier with said third identifier located within said modified at least one packet, by using said common switch.

12. The non-transitory machine-readable storage according to claim 11, comprising code for transferring said header portion of said modified at least one received packet to said at least said second blade server via said common switch.

13. The non-transitory machine-readable storage according to claim 11, wherein said common switch comprises a switch blade coupled to said common bus, and wherein said machine-readable storage comprises code for controlling said routing of said header portion of said modified received packet by said switch blade coupled to said common bus.

14. The non-transitory machine-readable storage according to claim 11, wherein said common bus comprises a backplane.

15. The non-transitory machine-readable storage according to claim 11, wherein said common switch comprises a bus transceiver and a bus controller.

16. The non-transitory machine-readable storage according to claim 11, wherein each of said first, second, and third identifiers comprises one or both of a MAC address and/or an IP address.

17. The non-transitory machine-readable storage according to claim 11, comprising:
code for acquiring said second identifier of said first blade server; and
transferring via said common switch, said acquired second identifier of said first blade server to at least said second blade server.

18. The non-transitory machine-readable storage according to claim 11, comprising code for broadcasting said header portion of said modified at least one received packet via said common switch.

19. The non-transitory machine-readable storage according to claim 11, comprising code for receiving a broadcast containing said modified at least one received packet.

20. The non-transitory machine-readable storage according to claim 11, comprising code for receiving at least one packet from said second blade server and transferring via said common switch, said header portion of said modified at least one packet received from said second blade server to at least one of said first blade server and a third blade server.

21. A system for communicating information, the system comprises:
at least one processor in a common switch that enables receiving at least one packet from a first blade server of a plurality of blade servers, wherein said at least one packet is designated for at least a second blade server of said plurality of blade servers, and wherein said first blade server and said at least a second blade server are coupled to said common switch via a common bus in a server;

said at least one processor determines at least a first identifier identifying said common switch, a second identifier identifying said first blade server, and at least a third identifier identifying said second blade server, wherein said first, second and third identifiers are located within a header portion of said received at least one packet;

said at least one processor modifies said at least one packet from said first blade server by changing said first identifier within said header portion; and said at least one processor routes via said common switch, at least a portion of said modified at least one received packet from said first blade server to at least said second blade server, based on said header portion of said modified at least one received packet, wherein said changing of said first identifier within said header portion comprises overwriting within said header portion of said modified at least one packet, said first identifier with said third identifier located within said modified at least one packet, by using said common switch.

22. The system according to claim 21, wherein said at least one processor transfers said header portion of said at least one received packet to said at least said second blade server via said common switch.

23. The system according to claim 21, wherein said common switch comprises a switch blade coupled to said common bus, and wherein said at least one processor controls said routing of said header portion of said received packet by said switch blade coupled to said common bus.

24. The system according to claim 21, wherein said common bus comprises a backplane.

25. The system according to claim 21, wherein said common switch comprises a bus transceiver and a bus controller.

26. The system according to claim 21, wherein each of said first, second, and third identifiers comprises one or both of a MAC address and/or an IP address.

27. The system according to claim 21, wherein said at least one processor:
acquires said second identifier of said first blade server; and
transfers via said common switch, said acquired second identifier of said first blade server to at least said second blade server.

28. The system according to claim 21, wherein said at least one processor broadcasts said header portion of said modified at least one received packet via said common switch.

29. The system according to claim 21, wherein said at least one processor receives a broadcast containing said at least one received packet.

30. The system according to claim 21, wherein said at least one processor receives at least one packet from said second blade server and transfers via said common switch, said header portion of said at least one packet received from said second blade server to at least one of said first blade server and a third blade server.

* * * * *